United States Patent Office 2,920,994
Patented Jan. 12, 1960

2,920,994

COMPOSITIONS AND METHODS FOR CONTROLLING PLANT RUST

Jean Ray Epperly, Pittsburg, Harry Charles Zeisig, Jr., Shawnee, Thomas Robert Hopkins, Johnson County, and Ralph Pearl Neighbors, Olathe, Kans., assignors to Spencer Chemical Company, Kansas City, Mo., a corporation of Missouri No Drawing. Application August 16, 1957
Serial No. 678,520

31 Claims. (Cl. 167—30)

This invention relates to chemotherapeutic compositions and methods of treating plants. More specifically, this invention relates to the treatment of plants with a chemotherapeutic composition to control plant rust.

Plant chemotherapy is the chemical therapy or chemical treatment of infections caused by the presence of an invading pathogen in a plant. Dimond et al., Phytopath., 42, 72–6 (1952), defined plant chemotherapy as "the control of disease by compounds that through their effect on the host or pathogen, reduce or nullify the effect of the pathogen after it has entered the plant."

The plant rusts, which are characterized by their orange, red, brown, or in the latter stages, black color, are found in nearly every place that plants are grown. Plants such as wheat, oats, barley, rye, beans and even certain wild grasses, and fruit, such as apples, may be attacked by rust fungi. The rust, which is caused by a very small parasitic fungus that enters the plant through its breathing pores, may appear on the leaves or stems of the plant. As the plant grows, the rust fungus develops pustules that contain countless reddish spores which are easily blown about by the wind, thus infecting other plants. During warm, moist weather, conditions which are very favorable for the development of the rust, the pustules may develop as often as every week, rapidly spreading the rust. The plant is damaged by the growth of the rust fungus and by the development of the spores since the rust fungi also utilize the water and nutrient materials required by the plant for normal growth. The rust may cause very extensive damage to the plant as well as kernels in the case of cereal plants. The size and number of kernels may be reduced and, in some cases, the kernels may be badly shriveled. When the young plants become heavily rusted the entire plant may be weakened and dwarfed, reducing the yield by as much as 90 percent.

The continuing efforts to develop rust-resistant strains of plants attests to the problem which rust presents. Many suggestions have been made for the control or alleviation of rust on plants. One of these is elimination of plants which may act as a host for the rust fungi during its development, such as the barberry bush. This and other proposals have not solved the problem. It is apparent that there is a need for an effective chemical composition to control rust readily and economically.

The object of this invention is to provide effective chemotherapeutic compositions and methods for the control of plant rust. A further object of this invention is to provide effective chemotherapeutic compositions and methods for the eradications of cereal rust. A still further object is to provide effective chemotherapeutic compositions and methods for the protection of cereal plants from further attack by the rust fungus. Further objects will be apparent from the following disclosure.

According to the present invention it has been found that by supplying a plant subject to attack by plant rust fungi with an ester of a carbazic acid at a location where the plant may adsorb or ingest the ester, the plant will be protected from attack by plant rust fungi. It has also been found that by contacting a growing cereal plant infected with a plant rust fungus with an ester of a carbazic acid, the rust will be eradicated without harm to the plant and the plant will thereby be protected against further attack by the rust fungus. By "supplying" is meant, generally, applying a carbazic acid ester to the surface of a plant or to soil in which the plant is growing or will be growing.

The esters of carbazic acid which will eradicate, or protect against, rust producing fungi in plants may be represented by the formula

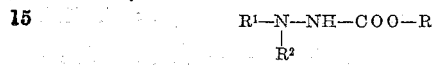

$$R^1-N-NH-COO-R$$
$$|$$
$$R^2$$

wherein R is an alkyl group, particularly a lower alkyl such as methyl, ethyl, propyl, isopropyl, butyl and pentyl, as well as haloalkyl groups; an alkenyl group such as the allyl group; an alkynyl group; an aryl group, particularly an aryl group such as naphthyl, phenyl, or a nuclear substituted phenyl group such as hydroxyphenyl, a halophenyl group such as chlorophenyl, the 3-nitrophenyl group, a lower alkoxyphenyl group such as methoxyphenyl, or a lower acyloxyphenyl group such as the acetoxyphenyl group; an aralkyl group, particularly in which the aryl moiety is monocyclic and the alkyl moiety is a lower alkyl group such as benzyl, phenethyl or phenylpropyl; or an alicyclic group such as cyclopentyl or cyclohexyl; and $R^1$ and $R^2$ represent the same or different groups including hydrogen, the groups represented by R above, and groups formed by joining $R^1$ and $R^2$ to form a cyclic secondary amino group in which the nitrogen is part of the ring, including monocyclic and polycyclic groups such as phthalimido, morpholino, pyrrolidino, piperidino, 1,2,3,4-tetrahydroisoquinolino, 1,2,3,4-tetrahydroquinolino, isoindolino, 4-methyl-1-piperazino, 3-hydroxypiperidino and 4-hydroxypiperidino. The compounds in which $R^1$ and/or $R^2$ represent a 3-nitrophenyl group are surprisingly much more active against cereal rust fungi than similar compounds in which the nitro group is present on the phenyl group in the 2 and/or 4 positions.

Such carbazates are known in the art and may be readily prepared by published procedures. One convenient process of preparing the carbazates is to react the appropriate hydrazine with an appropriate ester of chloroformic acid. This reaction may be represented as follows:

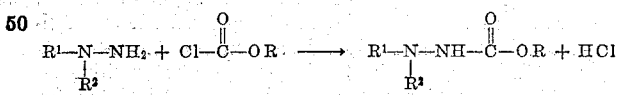

$$R^1-N-NH_2 + Cl-\overset{O}{\overset{\|}{C}}-OR \longrightarrow R^1-N-NH-\overset{O}{\overset{\|}{C}}-OR + HCl$$
$$|\phantom{R^1-N-NH_2}\phantom{+ Cl-C-OR \longrightarrow}|$$
$$R^2\phantom{-N-NH_2 + Cl-C-OR \longrightarrow}R^2$$

wherein R, $R^1$ and $R^2$ have the same significance assigned above. The reaction is generally effected by bringing the reactants together in the presence of an organic solvent, and advisably also in the presence of a strong base, such as pyridine, or an excess of the hydrazine, to neutralize hydrogen chloride as it is evolved in the reaction. The product is recovered from the reaction mixture by conventional manipulative steps.

The following examples illustrate methods of preparing the carbazates used in this invention:

(A) *Preparation of ethyl 3-(3-nitrophenyl)carbazate.*—Ethyl chloroformate (10.4 grams; 0.095 mole) was added drop-wise at 15–20° C. to a stirred solution of 14.4 grams (0.095 mole) of 3-nitrophenylhydrazine and 100 ml. of pyridine. After the addition of the chloroformate was completed, the mixture was stirred at about 25° C. for one hour and then poured into 150 ml. of cold 20% sulfuric acid. The carbazate crystals separated immediately and were removed by filtration, washed thoroughly with water, and then air dried. Recrystallization from 95% ethanol gave 14.8 grams (69%) of crystalline ethyl 3-(3-nitrophenyl)carbazate, melting at 113–115° C.

(B) *Preparation of isopropyl 3-(3-chlorophenyl)carbazate.*—To a stirred mixture of 36.8 grams (0.25 mole) of 3-chlorophenylhydrazine and 100 milliliters of 10% aqueous sodium hydroxide solution was slowly added 29 grams (0.24 mole) of isopropyl chloroformate at approximately 22 to 30° C. The mixture was stirred at room temperature for 45 minutes, and then made slightly acidic by the addition of 100 milliliters of 10% hydrochloric acid. The crude, crystalline product which precipitated was recrystallized from methanol to give 20.6 grams (33%) which melted at 95–97° C. Additional recrystallizations gave pure, crystalline isopropyl 3-(3-chlorophenyl)carbazate which melted at 96–97° C. and analyzed as follows: Calculated for $C_{10}H_{14}O_2N_2$: C, 52.6; H, 5.8. Found: C, 52.6; H, 5.8.

(C) *Preparation of ethyl 3-(3-chlorophenyl)carbazate.*—The procedure described in Example B was followed in reacting 27.1 grams (0.25 mole) of ethyl chloroformate with 38.6 grams (0.27 mole) of 3-chlorophenylhydrazine. Recrystallization of the crude product from a methanol-water mixture and then benzene-n-hexane mixture gave 8 grams (15%) of crystalline product which melted at 68–69° C. and analyzed as follows: Calculated for $C_9H_{11}O_2N_2Cl$: C, 50.4; H, 5.2. Found: C, 50.2; H, 5.2.

(D) *Preparation of 4-chlorophenyl 3-(4-bromophenyl)carbazate.*—The procedure of Example A was followed in reacting 9.6 grams (.05 mole) of 4-chlorophenyl chloroformate with 11.2 grams (.05 mole) of 4-bromophenylhydrazine in the presence of 150 milliliters of pyridine. Recrystallization from benzene-n-hexane gave 8.1 grams (47%) of crystalline product which melted at 180–181° C. and analyzed as follows: Calculated for $C_{13}H_{10}O_2N_2BrCl$: C, 45.7; H, 3.0. Found: C, 45.4; H, 2.8.

(E) *Preparation of ethyl 3-ethyl-3-phenylcarbazate.*—10.9 grams (0.1 mole) of ethyl chloroformate was reacted with 13.7 grams (0.1 mole) of 3-ethyl-3-phenylhydrazine in the presence of 125 milliliters of pyridine as described in Example A. Recrystallization of the crude product from benzene and n-hexane gave 12.3 grams (59%) of crystalline product which melted at 46–48° C. and analyzed as follows: Calculated for $C_{11}H_{16}O_2N_2$: C, 63.4; H, 7.7. Found: C, 63.8; H, 7.5.

(F) *Preparation of phenyl 3-ethyl-3-phenylcarbazate.*—The procedure of Example A was followed in reacting 15.7 grams (0.1 mole) of phenyl chloroformate with 13.6 grams (0.1 mole) of 3-ethyl-3-phenylhydrazine in the presence of 100 milliliters of pyridine. Recrystallization of the crude product from benzene and n-hexane gave 15.5 grams (65%) of pure product melting at 104–106° C. and analyzing as follows: Calculated for $C_{15}H_{16}O_2N_2$: C, 70.3; H, 6.3. Found: C, 70.0; H, 6.1.

(G) *Preparation of phenyl 3-(2,4-dichlorophenyl)carbazate.*—The procedure of Example A was followed in reacting 4.7 grams (.03 mole) of phenyl chloroformate with 6.2 grams (.03 mole) of 2,4-dichlorophenylhydrazine in the presence of 50 milliliters of pyridine. Recrystallization of the crude product from benzene and n-hexane gave 3 grams (33%) of crystalline product which melted at 125–126° C. Calculated for $C_{13}H_{10}O_2N_2Cl_2$: C, 52.5; H, 3.4. Found: C, 52.7; H, 3.5.

Elemental analyses and melting points of other new compounds prepared as above are as follows:

2-chloroethyl 3-(2-chlorophenyl)carbazate, M.P. 82–84° C., calculated for $C_9H_{10}O_2N_2Cl_2$: C, 43.4; H, 4.0. Found: C, 43.4; H, 3.9.

4-chloro-2-butynyl 3-phenylcarbazate, M.P. 76–77° C., calculated for $C_{11}H_{11}N_2O_2Cl$: C, 55.4; H, 4.6. Found: C, 55.5; H, 4.5.

Examples of other carbazates which are similarly produced and which may be used in this invention are methyl carbazate, ethyl 3-phenylcarbazate and 2-chloroethyl 3-phenylcarbazate.

The carbazates of the formula given above are highly active against plant rust fungi and particularly cereal plant rust fungi. Thus, as little as 0.1 pound applied uniformly to an acre of growing plants is effective although applications up to about 10 pounds per acre are sometimes desirable. The recommended application rates, however, are from about 0.25 pound to about 4 pounds of an active carbazate per acre. Soil applications of the carbazates are also effective and are especially good against wheat rust.

The high activity of the carbazates in controlling and eradicating cereal rust fungi only requires the application of very small amounts of the active ingredient distributed uniformly over a wide area. This is difficult to do employing the pure material. However, by increasing the bulk of the material, such as by mixing the carbazate with an inert diluent or carrier, the application to growing plants can be achieved more readily.

There are thus also provided by this invention novel chemotherapeutic compositions containing one or more of the described active carbazates intimately dispersed in an inert carrier or diluent for the intended use. Such carriers may either be solids such as talc, clay, diatomaceous earth, sawdust, calcium carbonate, and the like or liquids such as water, kerosene, acetone, benzene, toluene, and the like in which the active agent may be either dissolved or dispersed. Emulsifying agents may be used to achieve a suitable emulsion if two immiscible liquids are used as the carrier. Wetting agents may also be used to aid in dispersing the active carbazate in liquids used as a carrier in which the carbazate is not completely soluble.

Typical satisfactory emulsifying or wetting agents (surface active agents), which may be ionic or non-ionic, that may be used in such compositions would include alkali metal-higher alkylarylsulfonates such as sodium dodecylbenzenesulfonate, fatty alcohol sulfates such as the sodium salts of the monoesters of sulfuric acid with n-aliphatic alcohols containing 8–18 carbon atoms, sodium salts of alkylnaphthalenesulfonic acids, long chain quaternary ammonium compounds, sodium salts of petroleum-derived alkylsulfonic acids, polyoxyethylene sorbitan mono-oleate and alkylaryl polyether alcohols.

The concentration of carbazate in such compositions as applied to the growing cereal plants can be varied widely. For example, the carbazate may be from about 0.1% to about 25% by weight of the composition. Such compositions may be applied at any rate which is practical considering the bulk involved for distribution of an effective amount of the carbazate to the plants. The normal liquid bulk application is about 5 to 10 gallons per acre although from 1 to 100 gallons per acre is a practical range. When spraying from an airplane, usually not more than 10 gallons per acre are used, with the normal rate being 1 to 3 gallons per acre. With a dust, an application rate of up to 40 pounds per acre is practical. Considering these volumes and weights, it is obvious that the concentration of carbazate incorporated therein can be predetermined to effect the application of 0.1 to 10 pounds of carbazate per acre.

For convenience in manufacture, shipping and storage, and to provide a more economical product to the ultimate consumer, it is desirable to market concentrates or premixes containing such as from about 10% to about 75% by weight of an active carbazate intimately mixed with a carrier and other materials such as a surface active agent, stickers and the like, as is desired be present in the composition ultimately applied to plants.

Wettable powder concentrates are prepared by mixing the active carbazate with an inert solid diluent such as fuller's earth, bentonite and hydrated aluminum magnesium silicate and a wetting agent. One representative wettable powder has the composition:

50% (wt.) ethyl 3-(3-chlorophenyl)carbazate
40% hydrated aluminum magnesium silicate
7% sodium alkylnaphthalenesulfonate
2% ligninsulfonate
1% methyl cellulose A wettable powder such as this when mixed with water forms a dispersion which is particularly suitable for spray application. Enough water is generally used to provide sufficient carbazate in a final volume of 1 to 10 gallons per acre.

Other additives such as lanolin or kerosene emulsions, or Tween 20 (a product of Atlas Powder Company described as a sorbitan monolaurate polyoxyalkylene derivative), stickers, and other auxiliary materials may be included in solid or liquid formulations to increase coverage and penetration of the active carbazate. These substances are, in themselves, not active against cereal rust.

The following examples illustrate the effectiveness of the novel chemotherapeutic methods and compositions of this invention in controlling cereal rust.

EXAMPLE 1

Several dispersions in water containing 2000 p.p.m., 400 p.p.m. and 80 p.p.m. of a carbazate as the active ingredient were prepared as follows: One drop of Emulphor EL (the reaction product of ethylene oxide and ricinoleic acid) was added to each 100 milligram of carbazate and the two ground together in a mortar with the addition of sufficient water to bring the carbazate into an emulsion. Lanolin emulsion (water containing 20% lanolin) was added to each composition at the rate of 5% to aid in plant coverage and penetration.

Ten day old wheat plants were inoculated with spores of the leaf rust fungus, *Puccinia recondita*, and sprayed with the dispersions four days after inoculation. The plants were examined for disease control twelve days after inoculation. Table I sets out the per cent control of rust at concentrations of 2000 p.p.m., 400 p.p.m. and 80 p.p.m. of several carbazates tested in this manner.

Table I

| Carbazate | Percent Control of Rust at— | | |
|---|---|---|---|
| | 2,000 p.p.m. | 400 p.p.m. | 80 p.p.m. |
| ethyl 3-(3-chlorophenyl(carbazate | 100 | 100 | 95 |
| ethyl 3-phenylcarbazate | 100 | 99 | 95 |
| isopropyl 3-(3-chlorophenyl)carbazate | 100 | 100 | 90 |
| 2-chloroethyl 3-phenylcarbazate | 100 | 100 | 85 |
| 2-chloroethyl 3-(2-chlorophenyl)carbazate | 100 | 100 | 50 |
| ethyl 3-ethyl-3-phenylcarbazate | 99 | 90 | 50 |
| 4-chloro-2-butynyl 3-phenylcarbazate | 100 | | |
| emulsion check (containing Emulphor) | No control | | |

The results clearly show the effectiveness of the carbazates in controlling cereal leaf rust. At concentrations as low as 80 p.p.m., the carbazates gave nearly perfect eradication of the rust fungus. An examination of the plant leaves disclosed lesions at the site of infection, indicating the carbazate had entered the plant and probably concentrated at the infected areas, "burning out" the fungus. No injury to healthy plant tissue from the described compositions was observed.

EXAMPLE 2

Table II sets out the results of treatment with other typical compositions of this invention, prepared and tested as described in the previous example and containing 2000 p.p.m. of carbazate as the active ingredient.

Table II

| Carbazate | Percent Control of Wheat Leaf Rust at 2,000 p.p.m. |
|---|---|
| ethyl 3-(3-nitrophenyl)carbazate | 100 |
| 4-chlorophenyl 3-(4-bromophenyl)carbazate | 70 |
| phenyl 3-ethyl-3-phenylcarbazate | 90 |
| methyl carbazate | 50 |
| phenyl 3-(2,4-dichlorophenyl)carbazate | 95 |
| emulsion check (containing Emulphor) | No control |

Again the effectiveness of the novel compositions of this invention in controlling cereal rust is apparent.

EXAMPLE 3

The procedure of Example 1 was followed to test a series of carbazates against wheat stem rust using the causal organism *Puccinia graminis tritici*. The results are set forth in Table III following:

Table III

| Carbazate | Percent Control of Rust at— | | |
|---|---|---|---|
| | 2,000 p.p.m. | 400 p.p.m. | 80 p.p.m. |
| ethyl 3-(3-chlorophenyl)carbazate | 100 | 100 | 100 |
| 2-chloroethyl 3-(2-chlorophenyl)carbazate | 100 | 100 | 100 |
| isopropyl 3-(3-chlorophenyl)carbazate | 100 | 100 | 95 |
| ethyl-3-phenylcarbazate | 100 | 100 | 95 |
| 2-chloroethyl 3-phenylcarbazate | 100 | 100 | 95 |
| kerosene emulsion check | No significant control | | |

All the tested compounds are seen effective against wheat stem rust.

EXAMPLE 4

Ten day old bean plants were inoculated with *Uromyces phaseoli*, the causal organism of bean rust. Five days after inoculation the carbazates were applied by spraying as in Example 1. The results are shown in Table IV.

Table IV

| Carbazate | Percent Control of Rust at— | | |
|---|---|---|---|
| | 2,000 p.p.m. | 400 p.p.m. | 80 p.p.m. |
| 2-chloroethyl 3-(2-chlorophenyl) carbazate | 100 | 99 | NS |
| 2-chloroethyl 3-phenylcarbazate | 99 | 80 | NS |
| ethyl 3-phenylcarbazate | 99 | 60 | 40 |
| ethyl 3-(3-chlorophenyl) carbazate | 90 | NS | NS |
| isopropyl 3-(3-chlorophenyl) carbazate | 40 | NS | NS |

NS=not significant.

The variation in results was due to uneven inoculation.

EXAMPLE 5

An area of a field of spring oats with good leaf rust infection on the lower leaves and with relatively clean flag (top) leaves was selected for spray work.

Three carbazates were sprayed on 8′ x 15′ plots at rates of 2 and 1 pounds per acre. Seventeen gallons of water was used per acre. The chemicals were emulsified with Emulphor EL. Kerosene was used at a rate of 1% in the finished emulsion. Flag leaves were rated for rust control eleven days after spraying. The following control was obtained.

Table V

| Carbazate | Percent Control | |
|---|---|---|
| | 2 Pounds/Acre | 1 Pound/Acre |
| isopropyl 3-(3-chlorophenyl) carbazate | 55 | 82 |
| 2-chloroethyl 3-phenylcarbazate | 45 | 37 |
| ethyl 3-(3-chlorophenyl) carbazate | 60 | 77 |

The appearance of the leaves indicated the spray was put on too late in rust development to give maximum control. Tips of leaves on treated plots were frequently heavily infected whereas little infection was present at the base. Leaves on control plots were uniformly infected over the entire leaf.

EXAMPLE 6

The time required for ethyl 3-phenylcarbazate to be adsorbed in sufficient quantity to eradicate rust was determined by inoculating and spraying wheat plants as in Example 1, and washing the plants with a 1000 p.p.m. solution of Tide detergent 10 minutes, 1, 6 and 24 hours after spraying. Rust developed normally on plants washed 10 minutes after spraying. Normal rust control with ethyl 3-phenylcarbazate was obtained (95% @ 400 p.p.m.; 60% @ 80 p.p.m.) when plants were washed 1, 6, and 24 hours after spraying. At the 10 minute time the spray deposit was not dry whereas it was at the 1 hour time. These results indicate that adsorption takes place only while the spray deposit is moist.

EXAMPLE 7

To determine the effect of high humidity on adsorption of carbazates by plants, wheat plants were inoculated and sprayed as in Example 1 and then one lot was placed on a greenhouse bench (dry) and one lot was placed in a moist chamber (moist) for 24 hours and then placed on the bench. The results are set forth in Table VI and show an additional quantity of carbazate is adsorbed under moist conditions.

Table VI

| Carbazate | Percent Control Rust at— | | | | | |
|---|---|---|---|---|---|---|
| | 400 p.p.m. | | 80 p.p.m. | | 16 p.p.m. | |
| | Moist | Dry | Moist | Dry | Moist | Dry |
| isopropyl 3-(3-chlorophenyl) carbazate | 100 | 100 | 85 | 45 | 40 | NS |
| 2-chloroethyl 3-phenylcarbazate | 100 | 100 | 80 | 50 | 50 | NS |
| ethyl 3-phenylcarbazate | 95 | 95 | 70 | 50 | NS | NS |

EXAMPLE 8

Wheat plants in clay pots were inoculated as in Example 1 and four days after inoculation the soil was treated with carbazates at 100, 31 and 10 pounds per acre rates. The carbazates were applied as a drench. The results in Table VII indicate soil applications of the carbazates can be used to eradicate wheat rust. The data also indicate the carbazates translocate in the upward direction.

Table VII

| Carbazate | Percent Control of Rust at— | | |
|---|---|---|---|
| | 100#/A. | 31#/A. | 10#/A. |
| isopropyl 3-(3-chlorophenyl) carbazate | 95 | 95 | 50 |
| 2-chloroethyl 3-phenylcarbazate | 95 | 95 | 50 |
| ethyl 3-phenylcarbazate | 99 | 99 | 90 |

Various changes and modifications of the invention can be made, and to the extent that such variations incorporate the spirit of this invention, they are intended to be included within the scope of the appended claims.

What is claimed is:

1. A composition for the control of plant rust which comprises an inert carrier, a surface active agent, and a chemotherapeutic amount of a carbazate of the formula

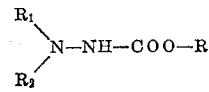

wherein R is a member of the group consisting of lower alkyl, haloalkyl, lower alkenyl, lower alkynyl, naphthyl, phenyl, halophenyl, 3-nitrophenyl, lower alkoxyphenyl and hydroxyphenyl groups, $R_1$ is a member of the group consisting of hydrogen and lower alkyl groups and $R_2$ is a member of the group consisting of naphthyl, phenyl, halophenyl, 3-nitrophenyl, lower alkoxyphenyl and hydroxyphenyl groups.

2. A composition for the control of plant rust which comprises an effective chemotherapeutic amount of a lower alkyl 3-(3-halophenyl)carbazate, a surface active agent and an inert carrier.

3. A composition for the control of plant rust which comprises an effective chemotherapeutic amount of a lower alkyl 3-phenylcarbazate, a surface active agent and an inert carrier.

4. A composition for the control of plant rust which comprises an effective chemotherapeutic amount of a haloalkyl 3-phenylcarbazate, a surface active agent and an inert carrier.

5. A composition for the control of plant rust which comprises an effective chemotherapeutic amount of 4-chloro-2-butynyl 3-phenylcarbazate.

6. A composition for the control of plant rust which comprises an effective chemotherapeutic amount of ethyl 3-(3-chlorophenyl)carbazate, a surface active agent and an inert carrier.

7. A composition for the control of plant rust which comprises an effective chemotherapeutic amount of ethyl 3-phenylcarbazate, a surface active agent and an inert carrier.

8. A composition for the control of plant rust which comprises an effective chemotherapeutic amount of isopropyl 3-(3-chlorophenyl)carbazate and an inert carrier.

9. A composition for the control of plant rust which comprises an effective chemotherapeutic amount of 2-chloroethyl 3-phenylcarbazate, a surface active agent and an inert carrier.

10. A composition for the control of plant rust which comprises an effective chemotherapeutic amount of 2-chloroethyl 3-(2-chlorophenyl)carbazate, a surface active agent and an inert carrier.

11. A composition for the control of plant rust which comprises an effective chemotherapeutic amount of ethyl 3-ethyl-3-phenylcarbazate and an inert carrier.

12. A composition for the control of plant rust which comprises an effective chemotherapeutic amount of ethyl 3-(3-nitrophenyl)carbazate and an inert carrier.

13. A composition for the control of plant rust which comprises an effective chemotherapeutic amount of phenyl 3-ethyl-3-phenylcarbazate and an inert carrier.

14. A composition for the control of plant rust which comprises an effective chemotherapeutic amount of phenyl 3-(2,4-dichlorophenyl)carbazate and an inert carrier.

15. A composition for the control of plant rust which comprises an effective chemotherapeutic amount of 4-chlorophenyl 3-(4-bromophenyl)carbazate and an inert carrier.

16. The method of controlling plant rust which comprises supplying a plant with a chemotherapeutic amount of a carbazate of the formula

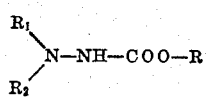

by applying the carbazate to a member of the group consisting of the surface of a plant and the surface of soil in which a plant grows, wherein R is a member of the group consisting of lower alkyl, haloalkyl, lower alkenyl, lower alkynyl, naphthyl, phenyl, halophenyl, 3-nitrophenyl, lower alkoxyphenyl and hydroxyphenyl groups, $R_1$ is a member of the group consisting of hydrogen and lower alkyl groups and $R_2$ is a member of the group consisting of naphthyl, phenyl, halophenyl, 3-nitrophenyl, lower alkoxyphenyl and hydroxyphenyl groups.

17. The method of controlling plant rust which comprises supplying a plant with a chemotherapeutic amount of a lower alkyl 3-(halophenyl)carbazate by applying the carbazate to a member of the group consisting of the surface of a plant and the surface of soil in which a plant grows.

18. The method of controlling plant rust which comprises supplying a plant with a chemotherapeutic amount of a lower alkyl 3-phenylcarbazate by applying the carbazate to a member of the group consisting of the surface of a plant and the surface of soil in which a plant grows.

19. The method of controlling plant rust which comprises supplying a plant with a chemotherapeutic amount of a haloalkyl 3-phenylcarbazate by applying the carbazate to a member of the group consisting of the surface of a plant and the surface of soil in which a plant grows.

20. The method of controlling plant rust which comprises supplying a plant with a chemotherapeutic amount of 4-chloro-2-butynyl 3-phenylcarbazate by applying the carbazate to a member of the group consisting of the surface of a plant and the surface of soil in which a plant grows.

21. The method of controlling plant rust which comprises supplying a plant with a chemotherapeutic amount of ethyl 3-(3-chlorophenyl)carbazate by applying the carbazate to a member of the group consisting of the surface of a plant and the surface of soil in which a plant grows.

22. The method of controlling plant rust which comprises supplying a plant with a chemotherapeutic amount of ethyl 3-phenylcarbazate by applying the carbazate to a member of the group consisting of the surface of a plant and the surface of soil in which a plant grows.

23. The method of controlling plant rust which comprises supplying a plant with a chemotherapeutic amount of isopropyl 3-(3-chlorophenyl)carbazate by applying the carbazate to a member of the group consisting of the surface of a plant and the surface of soil in which a plant grows.

24. The method of controlling plant rust which comprises supplying a plant with a chemotherapeutic amount of 2-chloroethyl 3-phenylcarbazate by applying the carbazate to a member of the group consisting of the surface of a plant and the surface of soil in which a plant grows.

25. The method of controlling plant rust which comprises supplying a plant with a chemotherapeutic amount of 2-chloroethyl 3-(2-chlorophenyl)carbazate by applying the carbazate to a member of the group consisting of the surface of a plant and the surface of soil in which a plant grows.

26. The method of controlling plant rust which comprises supplying a plant with a chemotherapeutic amount of ethyl 3-ethyl-3-phenylcarbazate by applying the carbazate to a member of the group consisting of the surface of a plant and the surface of soil in which a plant grows.

27. The method of controlling plant rust which comprises supplying a plant with a chemotherapeutic amount of ethyl 3-(3-nitrophenyl)carbazate by applying the carbazate to a member of the group consisting of the surface of a plant and the surface of soil in which a plant grows.

28. The method of controlling plant rust which comprises supplying a plant with a chemotherapeutic amount of phenyl 3-ethyl-3-phenylcarbazate by applying the carbazate to a member of the group consisting of the surface of a plant and the surface of soil in which a plant grows.

29. The method of controlling plant rust which comprises supplying a plant with a chemotherapeutic amount of phenyl 3-(2,4-dichlorophenyl)carbazate by applying the carbazate to a member of the group consisting of the surface of a plant and the surface of soil in which a plant grows.

30. The method of controlling plant rust which comprises supplying a plant with a chemotherapeutic amount of 4-chlorophenyl 3-(4-bromophenyl)carbazate by applying the carbazate to a member of the group consisting of the surface of a plant and the surface of soil in which a plant grows.

31. Ethyl 3-(3-nitrophenyl)carbazate.

References Cited in the file of this patent

UNITED STATES PATENTS 2,758,054   Smith et al. _____ Aug. 7, 1956

OTHER REFERENCES

Beilstein, XV, 287 (1932); 105, 106, 151, 166, 180 (1951).